United States Patent [19]

Morel

[11] 4,276,806

[45] Jul. 7, 1981

[54] SELF-RETAINED AND REUSABLE FASTENER

[75] Inventor: Henri Morel, Maule, France

[73] Assignee: ITW de France, Beauchamp, France

[21] Appl. No.: 55,713

[22] Filed: Jul. 9, 1979

[30] Foreign Application Priority Data

Jul. 13, 1978 [FR] France .................................. 78 21054

[51] Int. Cl.³ ............................................. F16B 13/06
[52] U.S. Cl. ........................................ 411/41; 411/15;
411/46
[58] Field of Search .................. 85/72, 80, 81, DIG. 2,
85/84, 5 R; 24/214, 208 A

[56] References Cited

U.S. PATENT DOCUMENTS

| | | | |
|---|---|---|---|
| 2,941,439 | 6/1960 | Rapata | 85/72 |
| 3,112,547 | 12/1963 | Poe | 85/5 R |
| 3,153,975 | 10/1964 | Rapata | 85/80 |
| 3,415,155 | 12/1968 | Riddell et al. | 85/80 |
| 3,568,263 | 3/1971 | Meehan | 85/72 UX |
| 3,611,861 | 10/1971 | Schulze | 85/80 X |

*Primary Examiner*—Ramon S. Britts
*Attorney, Agent, or Firm*—J. R. Halvorsen; T. W. Buckman

[57] ABSTRACT

The invention relates to a one-piece plastics fastener for positively fastening an element to a support, permitting removal of such element while the fastener is self-retained thereon.

The subject fastener of this invention is so devised as to enable it if necessary to be mounted on the element to be fastened prior to mounting of the two together on the support, which is important in the event of assembly-line operations.

A one-piece self-retained and reusable fastener according to this invention is characterized essentially in that it is constituted of two parts which are joined together before use by connecting means breakable at will, said first part being adapted, after the second part has been mounted by elastic deformation into at least the appropriate opening formed in the element to be fastened and, if necessary, into the appropriate opening formed in the supporting element, to penetrate, after said connecting tips have been broken, into the second part whereby to cause, on the one hand, its own sliding maintenance within the second part and positive and final locking of said second part in the opening formed in the element to be fastened and, on the other, when it is pushed home into the second part, locking thereof in the opening formed in the supporting element.

As is known, one-piece plastics fasteners are generally used to fasten various elements to a support. As a rule, such fasteners serve to receive a secondary fastening means such as a screw, and the two together secure such various elements to the support. Removal is effected by separating the secondary fastening means from the plastics fastener, whence the risk of losing one or the other of these two fastening elements when reassembling.

9 Claims, 4 Drawing Figures

SELF-RETAINED AND REUSABLE FASTENER

The present invention relates to a one-piece plastics fastener for positively fastening an element to a support, enabling such element to be removed whilst remaining attached thereto. The concept of the subject fastener of this invention is such as to enable it to be mounted on the element to be secured before they are mounted together on the support, this being important in the case of production work on an assembly line.

A one-piece self-retaining and reusable fastener according to this invention is characterised in that it is constituted by two parts connected together before use by frangible connecting means breakable at will, a first said part being adapted, after the second said part has been placed in position by elastic deformation in at least the complementary opening formed in the element to be fastened and, if necessary, in the adapted opening formed in the support element, to penetrate, after breaking the connecting means, into said second part whereby to cause, on the one hand, its own sliding maintenance in said second part as well as the positive and final locking of said second part in the opening of the element to be fastened; and on the other hand, when it is pushed fully home into said second part, to ensure the locking of said second part in the opening of the support element, or, when it is raised towards the entry of the second part, to permit withdrawal of assembly constituted by the fastener itself and the element to be fixed out of the supporting element and reutilisation of this assembly at will.

The description which follows with reference to the accompanying non-limitative exemplary drawings will give a clear understanding of how the invention can be carried into practice.

Figure 1:
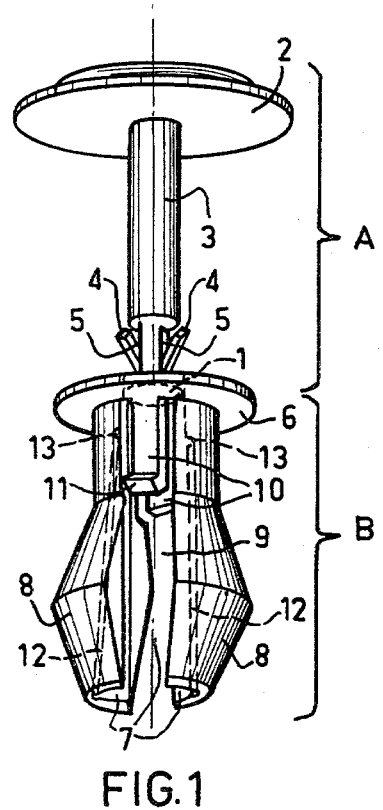
FIG. 1 is a perspective view of a one-piece fastener according to the invention.

A one-piece unlosable and reusable fastener according to this invention is constituted, before use, by an upper part A and a lower part B connected together by joining adjacent ends by a frangible means I in the manner well-known per se.

More particularly, the upper part A comprises a manipulating head 2, a locking stem 3, retaining strips 4 which in this instance are two in number, and corresponding recesses or grooves 5 formed in the lower part of locking stem 3 whereby, as will be explained in greater detail hereinafter, to enable the retaining strips 4 to retract thereinto when upper part A penetrates into lower part B until they reach their final positions.

Lower part B comprises a support collar or head 6; an internal longitudinal bore 7 of shape complementary to the locking stem 3 adapted to allow the same to be an easy sliding fit therein; fastening tabs or stud 8 having a cylindrical portion adjacent their attachment to head (6) and a substantially biconical shape at the end remote from said head and said tabs in this instance being two in number separated from each other by longitudinal separating slits 9 and having therein a continuation of bore (7); spring strips 10, in this instance two in number and having their heads fast with support collar 6 and formed with tapered retaining lugs 11 at their lower ends, said spring strips being positioned in the slits 9 whereby to retract thereinto when the fastener is inserted into the element to be fastened, as will be more clearly apparent hereinafter; longitudinal guiding grooves 12 formed laterally along the bottom of internal recess bore 7 and inside which grooves (12) the retaining strips 4 of upper part A are slidable; and restraining stops 13 provided at the upper ends of said guiding grooves 12 spaced from head (6) and which, as will be explained in greater detail hereinbelow, are adapted to operate as a non-removable restraining system for the retaining strips 4 of upper part A.

It is a further teaching of this invention that the element C to be fastened must be formed with an opening or aperture matching the upper portion of the lower part of the one-piece fastener, that is, having a complementary cylindrical upper portion 14 and, in its thickness, a recess or counter bore 15 of greater diameter for receiving the retaining lugs 11 of spring strips 10.

The support D is formed with an opening 16 of diameter such as to permit passage, as will become more clearly apparent hereinafter, of restraining tabs 8 by elastic deformation and subsequent locking thereof by penetration of stem 3 into recess 7.

More particularly, the one-piece fastener as shown in FIG. 1 can be mounted either in a single stage, with the two elements C and D placed one over the other and having openings (14) and (16) aligned, or in two stages, for instance in the case of mountings effected on an assembly line. For greater clarity, the process of mounting in two stages will now be described with reference to FIGS. 3 and 4.

In an initial stage, element B is inserted through the opening 14, 15 formed in the element C to be fastened. The restraining tabs 8 deform elastically as they penetrate into said opening, then the spring strips 10 pass through upper opening 14. During this stage, the retaining lugs 11 retract into recess bore 7 and then when they have traversed openings (14) they expand and lodge in the recess 15 in the position shown in FIG. 3.

Obviously, the height H of opening 14 is so determined that when support collar or head 6 contacts one surface of the element C, the retaining lugs 11 are in a locking position within recess 15 with the restraining tabs 8 projecting from the opposite surface of element C. This ensures perfect contact between element C and support element D.

The one-piece fastener is at this point retained with the element-to-be-fastened C, and this operation can manifestly be performed independently before the fastener/element-C assembly is mounted on support panel D.

This assembly is then aligned with the matched opening 16 formed in support D. The biconical portion of restraining tabs or stud 8 retract elastically in order to pass through said opening, and this by virtue of the separating slits 9, and element-to-be-fastened C comes into perfect contact with support panel D at E, as shown in FIG. 4.

Figure 3:
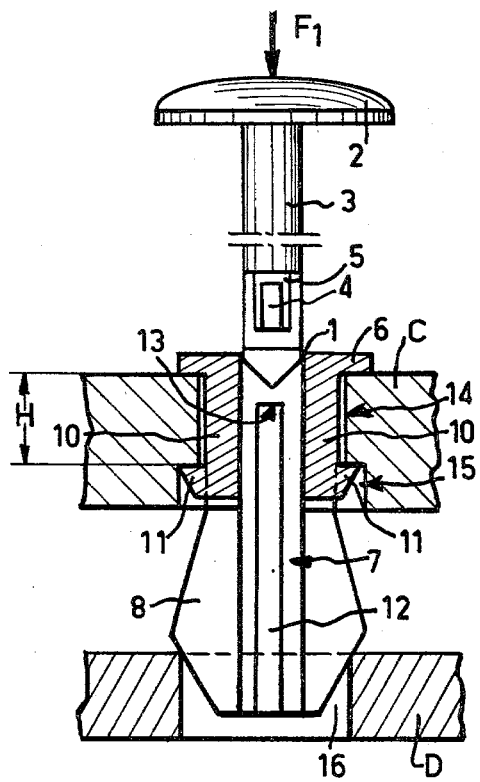
FIG. 3 is a longitudinal sectional view of the one-piece fastener, mounted on the element to be fastened and ready for mounting on the support.
Figure 2:
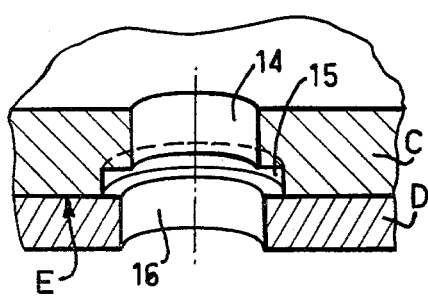
FIG. 2 is a perspective view in cross-section of the openings formed in the element to be fastened and in the support.
Figure 4:
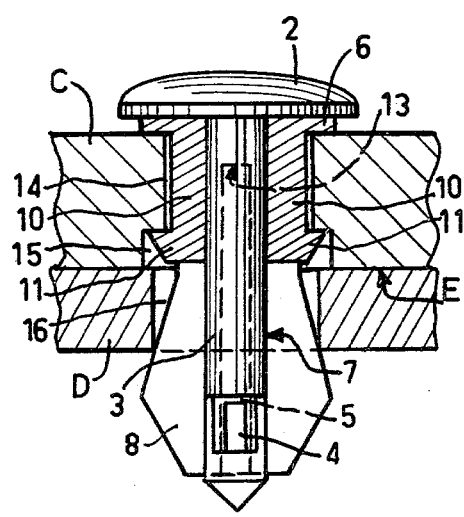
FIG. 4 is a longitudinal sectional view corresponding to FIG. 3, the one-piece fastener being shown in this case as it appears mounted both on the element to be fastened and on the support.

It is then necessary to exert on manipulating head 2 a force in the direction of arrow $F_1$ in order to break the frangible means at I connecting the upper and lower parts A and B and move the stem (3) from the position shown in FIG. 3 to the position shown in FIG. 4.

During this stage, locking stem 3 slides along the matching complementary internal bore 7. The retaining strips 4 retract into the grooves 5 and thereafter splay open into the grooves 12 as soon as they have passed beyond the retaining stops 13. Locking stem 3 continues to descend until manipulating head 2 bears against support collar 6. The effect of this is on the one hand to restrain the spring strips 10 and lock the retaining lugs 11 in recess 15, and on the other to lock the restraining tabs 8 in a splayed locking position against the lower edge of opening 16 in support panel D.

Fastener C is then correctly mounted in support D.

Another important teaching of this invention is that the element to be fastened can be released as follows:

Upper part A is disengaged from lower part B by means of a suitable tool such as a screwdriver inserted beneath manipulating head 2. Retaining strips 4 then slide along grooves 12 until they abut against retaining stops 13. Meanwhile the strips 10 are held immovable since retaining lugs 11 are captive and made fast with the element-to-be-fastened C by locking stem 3. Conversely, then bi-conical portion of restraining tabs 8 are released and allow the panel assembly to be disengaged, the element-to-be-fastened C together with the fastener being withdrawn through opening 16 in support panel D as said restraining tabs deform elastically.

It is important to note that the assembly can be reused. This is effected, as described above, by applying the element to be fastened C against support panel D in order to obtain suitable contact at E, the restraining tabs 8 penetrating without difficulty into opening 16 by virtue of the separating slits 9. At this point, force is exerted on the manipulating head II to move it into contact with support collar 6, thereby locking the assembly once more.

A fastener according to this invention is in principle intended for direct mounting of an element-to-be-fastened C on a support panel D. However, it permits of prior mounting on the element to be fastened, and this with or without locking of the strips 10 and the retaining lugs 11, whenever this method is considered to be more advantageous.

After an initial utilisation involving fastening the element-to-be-fastened C on a support D, the fastener remains mounted in retained relation on element C and can be used again.

It goes without saying that changes and substitutions may be made in the exemplary embodiment hereinbefore described without departing from the scope of the invention as set forth in the appended claims.

I claim:

1. A fastening assembly including a one piece self-retained reusable plastic fastener in combination with at least a pair of elements to be fastened together including
an apertured first element wherein said aperture has a first predetermined extent,
an apertured second element wherein said aperture has a second predetermined extent less than said first predetermined extent and recess means which has a third diametral extent greater than said first predetermined extent and forming shoulder means spaced a predetermined distance from a surface of said second element,
said fastener including a male member and a female member initially joined by a frangible means in coaxial relationship
said female member including a head and a stud extending integrally therefrom with a common bore transversing the head and substantially all of said stud,
said stud including a first portion adjacent to said head complimentary to said second aperture and a second portion at the end opposite said head and having shoulder means intermediate its extremities, said shoulder means being greater in measurement than said first predetermined extent
said stud being bifurcated by at least one slot throughout substantially its entire axial extent, and forming at least two flexible tabs,
groove means extending axially within the base of said bore but terminating abruptly in spaced relationship to said head to form a shoulder facing away from said head,
at least one spring strip integral at one end with said head and extending axially within said at least one slot, said strip having a laterally extending shouldered lug at its opposite end and spaced from said head a distance substantially equal to the distance of said recess means from the surface of said second element,
said male member including a rigid locking stem having manipulation means at one end and initially connected coaxially by frangible means to the head of said female member at its opposite end,
at least one resilient retaining strip extending outwardly from said stem adjacent said opposite end and positionable within a stem recess when said stem is axially driven into said bore through said female head, said at least one strip being aligned with and complimentary to the groove means within said bore,
whereby the first portion of the stud of said female member can be telescopically assembled into the aperture of said second element until said lugs interlock with said recess means, said second portion having shoulder means being then positioned within the aperture of said first element, an axial force against manipulation means of said locking stem causes said frangible means to fracture, said retaining strips collapse inwardly during passage of said stem through said bore until they pass said groove shoulder and are adapted to then expand to lie within said groove and permit non-rotatable axial movement of said stem to a position for locking said lug carrying spring strip within the recess of said second element and said shouldered second portion within the aperture of said first element,
an oppositely directed axial force on said manipulation means causes said locking stem to be retracted through said head until the free ends of said retaining strip contacts said shoulder in said groove thereby permitting removal by inward flexing of said second portion of the stud tabs from said first apertured element, while retaining said first portion in assembled locked relationship with said second element reassembly with said first element being possible by reversal of the procedure.

2. A fastener assembly of the type claimed in claim 1 wherein said second portion having shoulder means intermediate its extremities is substantially bi-conical in configuration and tapers outwardly from its free end to intermediate shoulder means then inwardly to its juncture with said first portion.

3. A device of the type claimed in claim 1 wherein said shouldered lug normally extends radially to an extent greater than said second predetermined extent, but less than said third diametral extent, said lug being tapered at the end opposite the contacts of said strip to said head to facilitate introduction into and through said second predetermined extent of the aperture in the second element.

4. An assembly of the type claimed in claim 1 wherein said manipulation means on said rigid locking stem is a head complimentary to the head of said female member.

5. A device of the type claimed in claim 1 wherein said head has a greater radial extent than the head of said female member to accept tool means for retrograde movement of said stem from said bore.

6. A device of the type claimed in claim 1 wherein all of said apertures are substantially circular in configuration and said female member is complimentary in configuration.

7. A device of the type claimed in claim 6 wherein said apertured second element recess means are a counterbore extending inwardly from the surface of said element opposite the surface confronting introduction of the female member and on which said female member head will rest when in unassembled relationship.

8. A one piece plastic reusable fastener including a head, a bifurcated shank extending axially from said head a predetermined distance and having a through bore extending through said head and the entire length of said shank, a drive stem initially frangibly connected adjacent one end to said head and disposed coaxially to said bore, manipulation means integral with and connected to the opposite end of said locking stem, resilient retaining means positioned adjacent to said frangible connection and extending upwardly and outwardly away from said end, the measurement from the free ends of said resilient retaining means to the opposite end of said stem being less than said predetermined length of said shank, each of the portions of said bifurcated shank having groove means in the base of said bore and terminating in spaced relation to said head to form stop means, said resilient retaining means being a pair of oppositely disposed resilient fingers axially aligned with said groove means, a recess in said stem whereby said fingers are depressed and accepted in said recess as said stem is driven through said fastener head into said bore and then expand outwardly when they are axially disposed adjacent said groove means, and permit said stem to be moved by said manipulation means within the bore of said shank but prevented from total withdrawal by engagement of said resilient retaining means with said stop means.

9. A fastener of the type claimed in claim 8 wherein said head has a predetermined diametral extent and said manipulation means is a laterally extending head member greater in diametral extent than said predetermined diametral extent whereby said manipulation head covers said fastener head and its engagement with said fastener head when said stem is driven to its final position.

* * * * *